Figure 1:
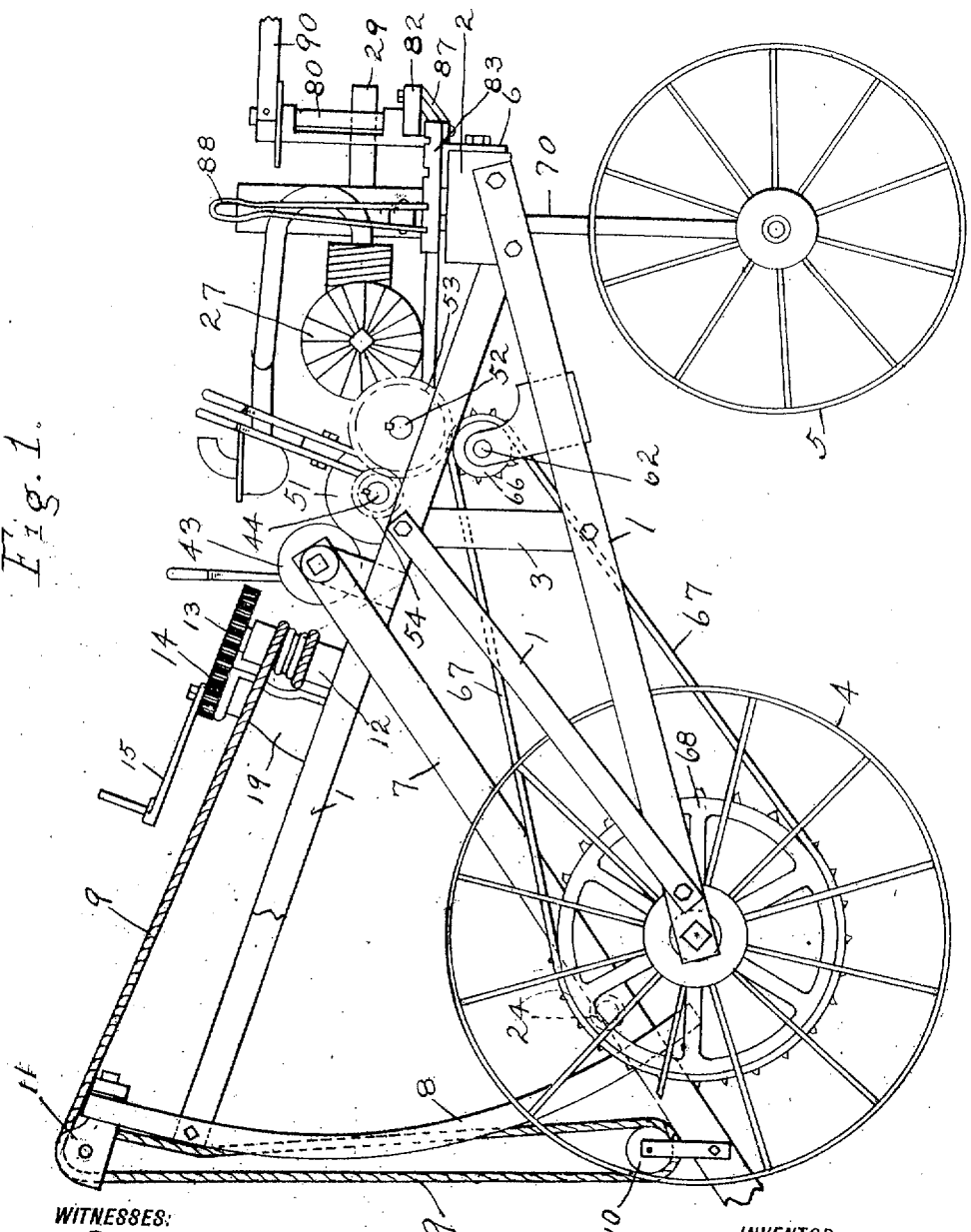

G. W. LORIMER.
SAND CUTTING MACHINE.
APPLICATION FILED JUNE 6, 1908.

973,523.

Patented Oct. 25, 1910.
6 SHEETS—SHEET 1.

WITNESSES:

INVENTOR
George W. Lorimer
BY
Townsend Decker
ATTORNEY

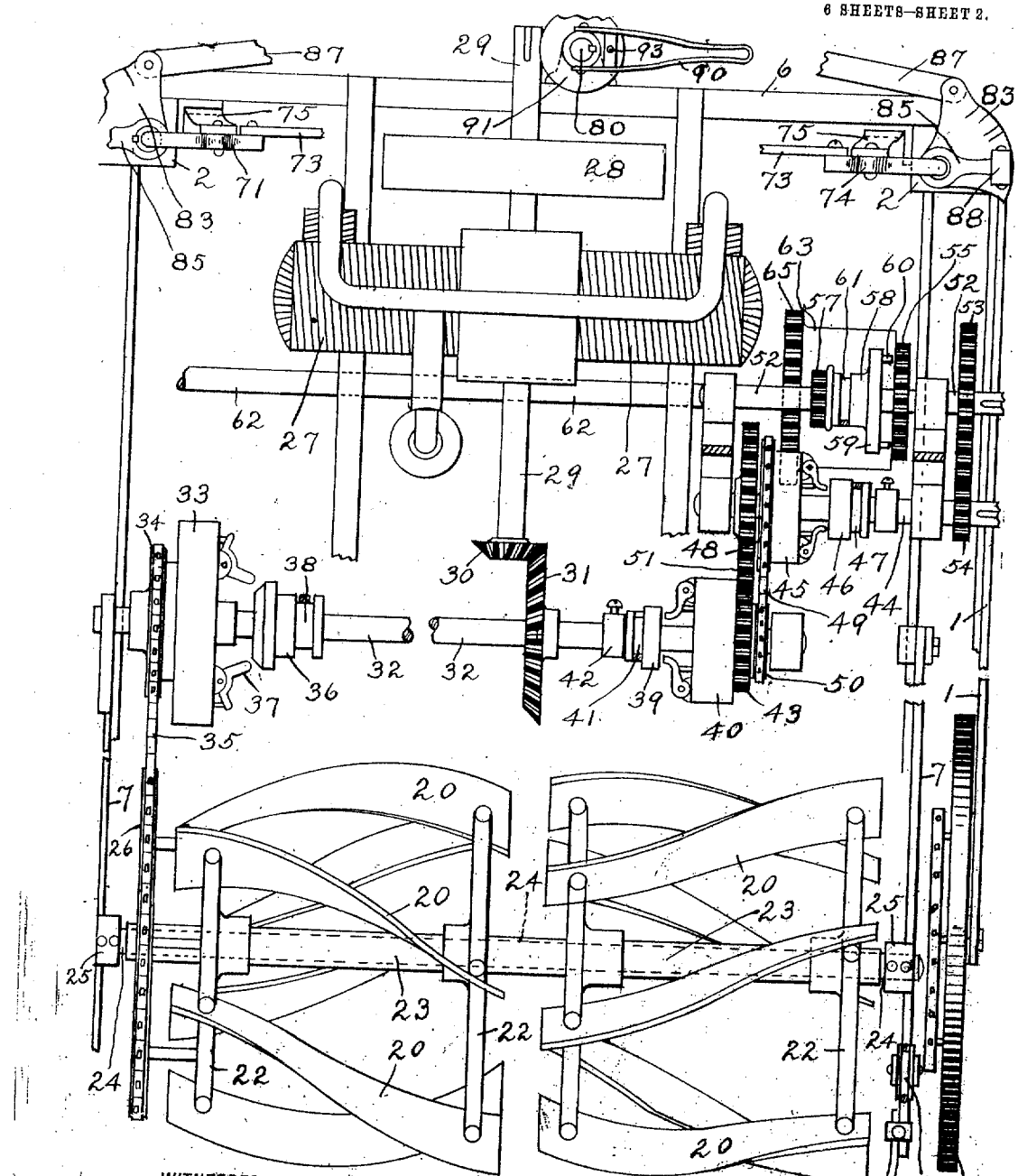

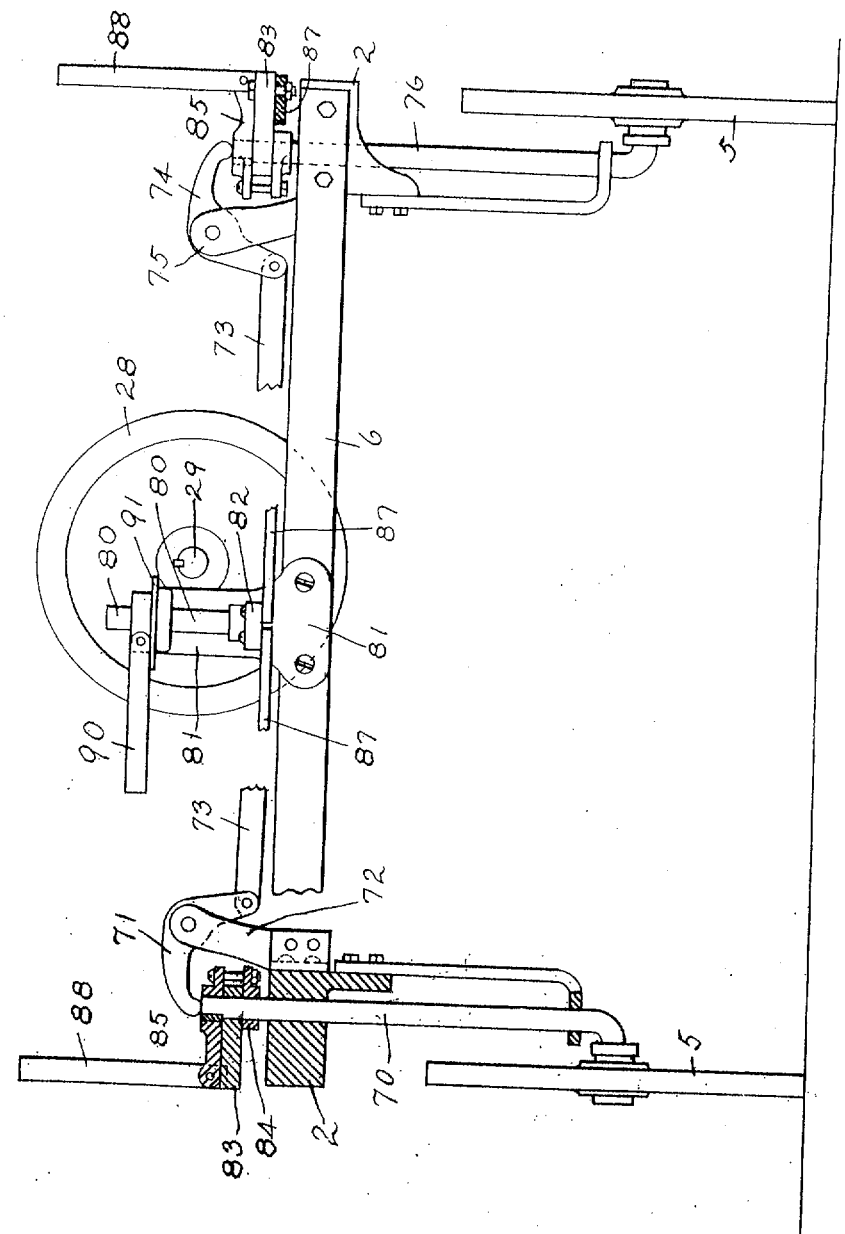

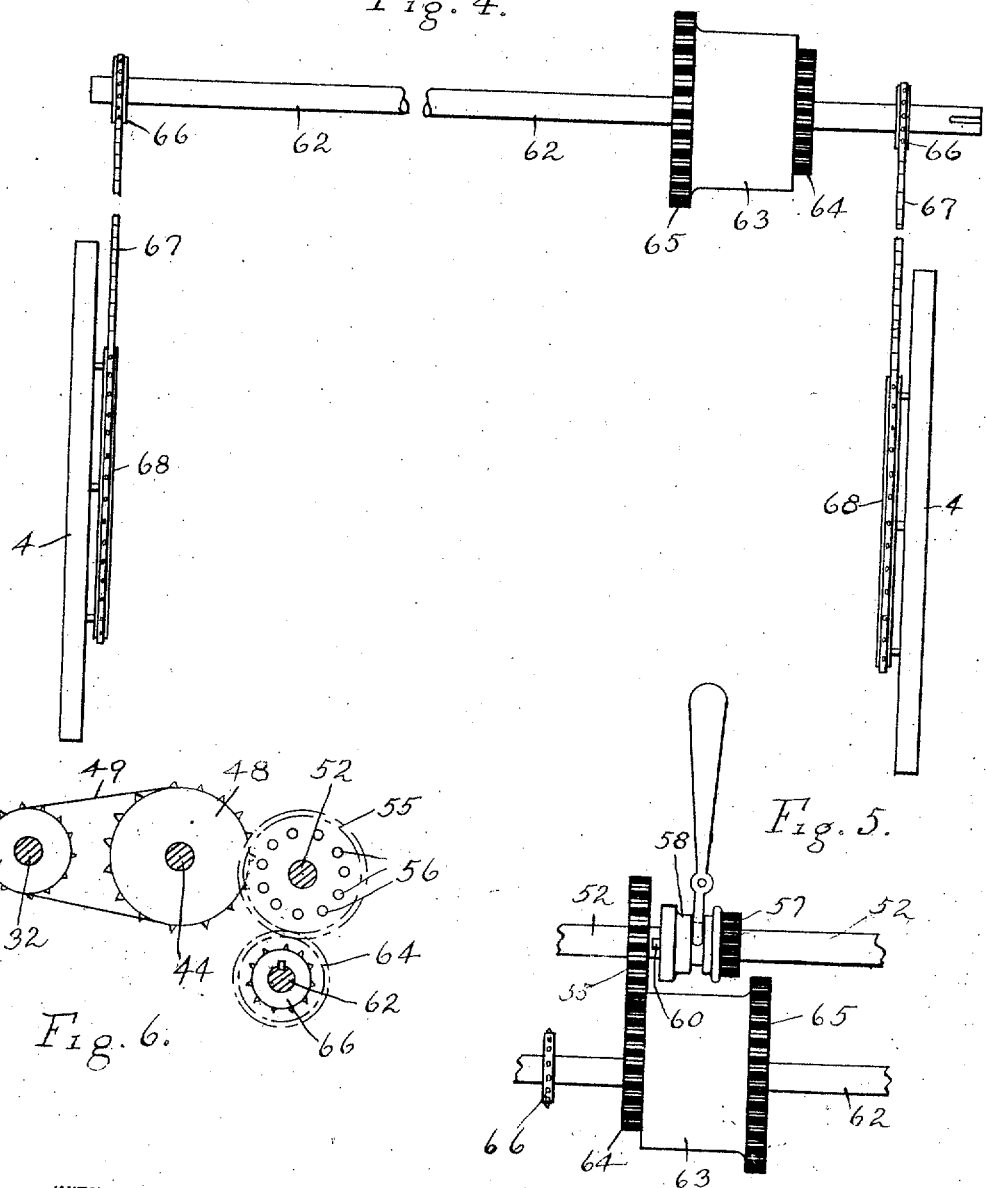

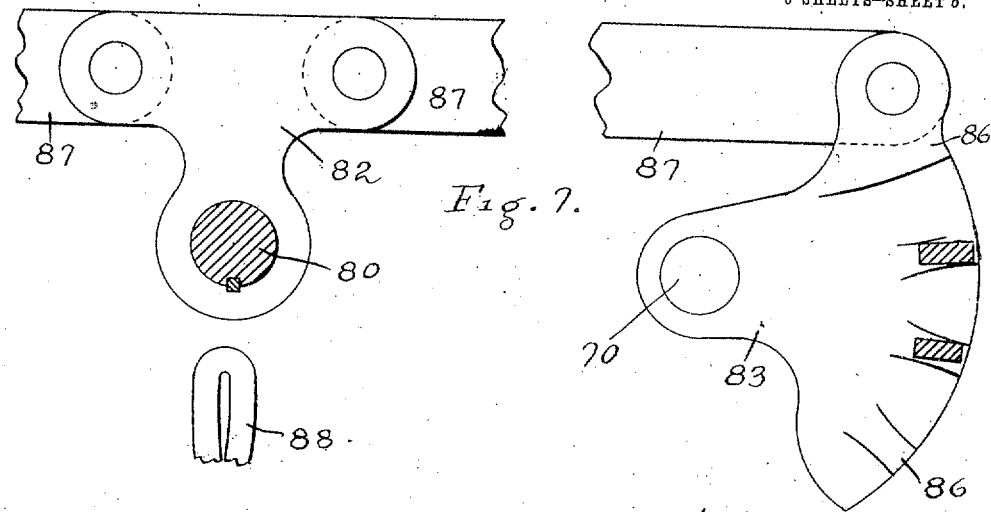
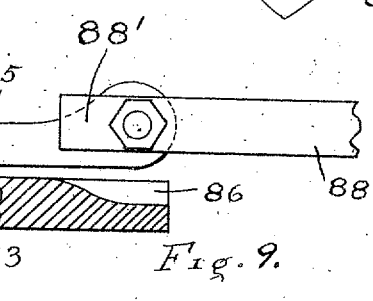
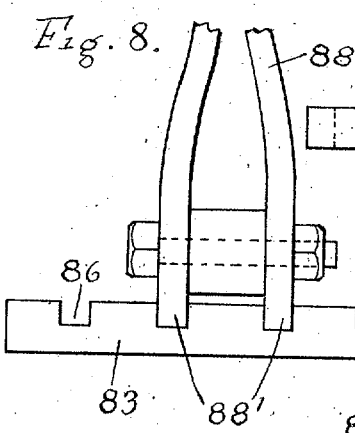
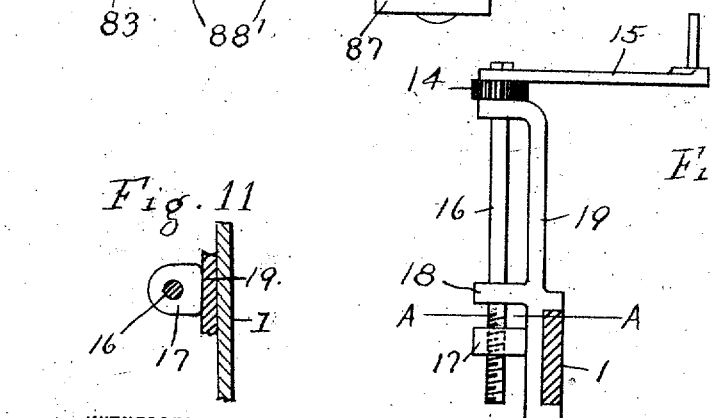

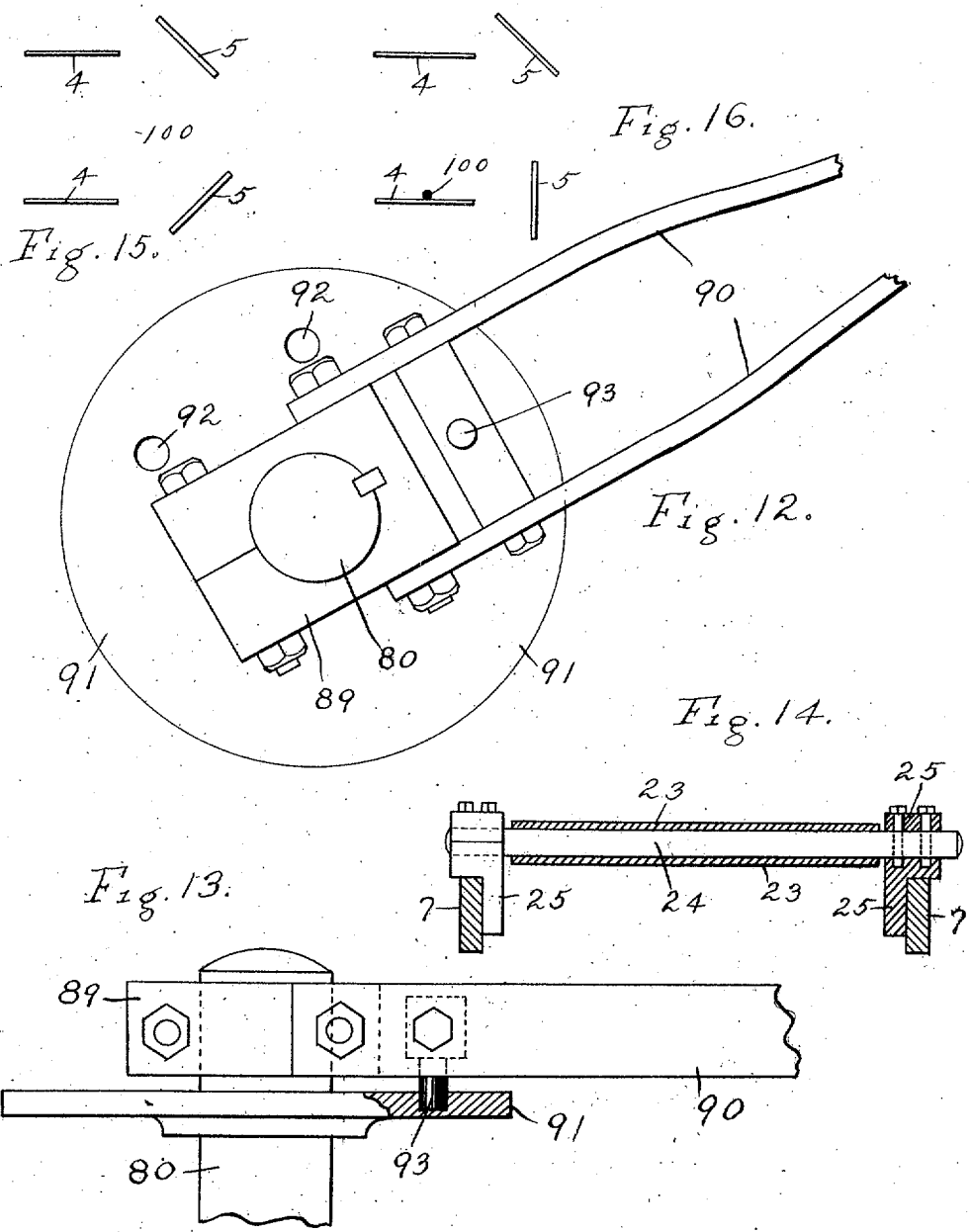

UNITED STATES PATENT OFFICE.

GEORGE W. LORIMER, OF PIQUA, OHIO, ASSIGNOR, BY MESNE ASSIGNMENTS, TO THE SAND MIXING MACHINE COMPANY, OF GREENFIELD, OHIO, A CORPORATION OF OHIO.

SAND-CUTTING MACHINE.

973,523.  Specification of Letters Patent.  Patented Oct. 25, 1910.

Application filed June 6, 1908. Serial No. 437,176.

*To all whom it may concern:*

Be it known that I, GEORGE W. LORIMER, a citizen of the United States, and a resident of Piqua, in the county of Miami and State of Ohio, have invented certain new and useful Improvements in Sand-Cutting Machines, of which the following is a specification.

My invention relates to machines for mixing, cutting or kneading sand such as used in foundries and constitutes an improvement over the machine shown and described in Letters Patent to W. G. Stockham No. 823,710 and to W. G. Stockham and F. L. Doyle No. 873,391.

The main object of my invention is to construct a machine of the above character which will be capable of being readily operated by one man and which will be more compact in construction and manipulated with greater ease than in machines of this type previously in use.

Another object of my invention is to so construct the machine that the driven parts will be independently operated, such as the carriage and the cutters, or mixers, whereby the carriage can be driven about without operating the cutters or vice versa.

Another object is to obviate undue strain upon the frame or supporting parts of the machine.

A further object is to provide a machine of this character with means whereby the same can be caused to turn about different points thereof as pivots so that posts, large castings and the like can be readily circled without having to make a wide turn and then zig-zag the machine back into the desired position for cutting the sand.

A further object is to prevent the cutters becoming damaged by contact with a large solid object through which they will not penetrate.

A still further object is to eliminate friction on the steering parts of the machine and further to so mount the cutting-blades or mixers that the rotary shaft upon which they are mounted will not be affected by the machine passing over uneven ground or by having the rotary elements out of a true horizontal line.

With these and other objects in view which will be apparent from the subjoined description, my invention consists in providing a sand-cutting or mixing machine consisting of a carriage and a sand cutting or mixing drum, with means for propelling the carriage and also for revolving the cutting drum and organized in such a manner that the carriage and drum can be driven at the same time, or the carriage can be driven and the drum remain quiet or the drum can be driven and the carriage remain motionless and also so that the relative speed of the carriage and cutter drum can be varied.

The invention also consists in operating the cutting drum through a clutch capable of being adjusted so that should the blades of the cutting drum strike a large piece of solid matter, the clutch will slip and prevent damage to the blades.

My invention consists further in providing adjusting means for controlling the drop of the cutting drum so that the blades will not come into contact with the ground when lowered into operating position.

The invention consists further in mounting the machine at its forward end on suspension devices and also in mounting the steering wheels so that they will be capable of vertical movements independent of the frame whereby they can yield when traveling over uneven ground and yet not tilt the platform supporting the machine elements.

My invention consists further in providing means whereby the point about which the machine turns as a pivot can be varied to cause the machine as a whole to revolve in different arcs. This part of my invention consists in loosely mounting the steering wheels whereby they can be turned independent of each other and providing them with locking means to secure them in any desired angular position with relation to the carriage.

My invention consists further in the details of construction and combinations of parts hereinafter more particularly described and then specified in the claims.

In machines of this character heretofore employed it has been the custom to pull them by hand or to drive them by an electric motor. In the latter type a reel was necessary to take up and pay out the current carrying cable for the motor as the machine traveled back and forth over a sand heap. This construction is very objectionable owing to difficulties in reversing the machine and to the long length of cable necessary to traveling over a great length of sand. Also heretofore the cutting-drum has always revolved with the travel of the carriage and could not revolve if the carriage stood still nor could the relative speed of the cutting drum and the carriage be varied. Further no allowance was made for the uneven surface over which the machine had to travel and if the cutting blades struck a solid obstruction the motive power either had to stop or the blades would be damaged. Further the cutting blades were mounted on a shaft which was journaled in the side frames of the machine so that if both frames in which the ends of the shaft were journaled were not exactly even the shaft would bind in the bearings. I avoid this latter objection by mounting the cutting-blades on a hollow sleeve which rotates on a shaft whose ends are permanently fixed in the side frames, so that any angularity of the frames will not affect the rotation of the drum. Further in previous constructions the steering wheels were rigidly secured to the frame and could only be turned in the usual way so that it was impossible to circle closely around a post or other obstructions. Further in the previous constructions it was necessary to have at least two men to operate the machine owing to necessity of uncoupling one wheel when turning etc. while in my improved machine one man can readily and easily operate it, the different speeds of the wheels necessary in turning being taken care of by a differential gearing.

In the accompanying drawings Figure 1, illustrates a side elevation of a machine embodying my invention. Fig. 2, is a plan of the same, parts being removed. Fig. 3, is a front elevation and partial section, parts being removed. Fig. 4, is a plan of the driving wheels and differential gearing through which they are driven, detached from the rest of the machine. Fig. 5, is a front elevation of the differential gearing together with its attendant means for coupling it to the power. Fig. 6, is a side elevation of part of the driving train. Fig. 7, is an enlarged plan and partial section of the locking plates for the steering wheels and shows the links connecting it to the steering post. Fig. 8, is an edge view of the detail shown in Fig. 7. Fig. 9, is another edge view of the same showing the locking lever in released position. Fig. 10, is a detail view of the winch for raising and lowering the cutting-drums. Fig. 11, is a horizontal section on line A, A, Fig. 10. Fig. 12, is a plan of the steering lever and locking plate. Fig. 13, is a side elevation of Fig. 12. Fig. 14 is a section illustrating the mounting of the cutting-drum and the blades being removed. Figs. 15 and 16 illustrate diagrammatically different positions in which the steering wheels can be locked and the pivot points about which the machine will turn when wheels are so adjusted.

Referring more particularly to Fig. 1 the carriage proper consists of a frame work on either side made up of a number of bars 1 secured at their front end to a block 2 and braced by a suitable bracket 3 and is provided with a pair of rear wheels, constituting the driving wheels and a pair of front wheels, 5 constituting the steering wheels. The said frames are connected together by suitable cross bars 6 preferably of angle-iron to strengthen the carriage and provide supports for the various mechanism of the device.

Pivotally mounted at one end of the side frame is a bar or beam 7, one being provided at either side and to said bars the revolving cutter-drum is mounted as will presently be described. The free ends of the bar work in guides 8 at either side of the frame, said guides being suitably secured to the main frame. The free ends of the bar 7 are supported by a cable 9 secured at one end to the guides 8 and passing under a pulley 10 secured to the bar 7. The cable passes up and over a pulley 11 secured to the upper part of the guide 8 and has its other end secured to a suitable winding-drum 12, mounted upon the frame 1. The bar 7 on the opposite side of the machine is similarly supported by cable and by passing over pulleys this cable is secured to the drum 12. To the drum 12 is secured a gear 13 in mesh with a pinion 14, said pinion being provided with a suitable operating handle 15. When it is desired to raise or lower the cutting drum the pinion 14 is revolved which causes the cutters to be raised or lowered according to the directions of rotation. In the position shown in Fig. 1 the bars 7, carrying the drum, (drum not shown) has been lowered to position for cutting or mixing the sand. Referring to Figs. 10 and 11 the pinion 14 is keyed to a shaft 16 which revolves therewith. The lower part of the shaft 16 is threaded and provided with a nut 17 which, when the pinion 14 is rotated to drop the cutting drum, travels up the shaft 16 until it strikes a fixed projection 18 from the bracket 19 which supports the various parts, thereby preventing further rotation of the pinion 14 and consequent lowering of the operating drum, the nut 17 having been previously adjusted to strike the projection 18 when the cutting drum has reached the desired level. As will be seen in Fig. 11 the nut 17 is provided with enlargements on the side which rides against the bracket 19 so that the same is prevented from turning with the shaft 16.

The cutting-drum consists of a number of blades twenty (20) preferably arranged in two sets and so shaped that in revolving they will throw the sand upward and toward the center as shown and described in the patents above referred to. The bars 7 are also provided with a rearwardly and inwardly projecting blade 21 to throw the material upward in the back of the machine as is also shown and described in the patent above referred to. The cutter-blades 20 are secured to radially projecting arms carried by spiders 22 fixed to a hollow shaft or sleeve 23. Passing through the hollow shaft is a fixed shaft 24 upon which the drum revolves. The fixed shaft 24 is rigidly mounted in brackets 25 secured to the bars 7 as clearly illustrated in Fig. 14. 26 indicates a sprocket wheel secured to one of the spiders 22 and by means of which the cutting-drum is caused to revolve as will be hereafter described.

27 indicates cylinders of a hydro-carbon engine suitably supported upon the frame work of the machine and provided with the usual fly wheel, 28. The crank-shaft 29 is continued beyond the crank case and is provided at one end with the usual means for engagement by the ordinary starting crank and to the other end is secured a beveled pinion 30 which meshes with a bevel gear 31 fixed on the main power shaft 32, said pinion and gear transmitting the power from the engine to the main power shaft 32. The coils, batteries, oilers, gasoline tank etc., for the engine being arranged as usual, illustration is dispensed with for the sake of clearness.

33 indicates a multiple disk clutch of the usual construction and mounted loose on the shaft 32. Secured to the casing of the clutch 33 is a sprocket wheel 34 connected to the sprocket wheel 26 of the cutting drum or cylinder by a chain 35. Mounted fixed on the shaft 32 is a collar 36 forming the fixed member of the clutch and adapted to slide longitudinally thereon on a feather to bring it into engagement with the dogs 37, on the loose member of the clutch and cause the loose member 33 to be coupled to the shaft 32. The collar 36 is operated by a handle (not shown) working in a groove 38 as is usual in such forms of clutches. The cutting-drum or cylinder is raised to its highest position away from the ground before starting the machine. The clutch 33 is coupled to the shaft 32 and the cutting drum starts to revolve and at the same time it is lowered so that it will gradually cut its way into the sand. The clutch 33 is adjusted so as to slip when about 10% above the normal load has been reached so that in case the cutting blades strike a heavy casting or other solid obstruction in the sand the clutch will slip and prevent injury to the blades. Also mounted on the main power shaft 32 is a second multiple-disk clutch consisting of a fixed member 39, and loose member 40, said fixed member being operated by a lever (not shown) working in a groove 41, as usual. A stop 42 is provided to prevent the fixed member being moved farther than necessary to disengage the clutch. Secured permanently to the loose member 40, of the clutch is a gear wheel 43 loose upon the shaft 32. This clutch controls the reverse movement of the machine as will be hereinafter explained.

44 indicates a counter shaft journaled in suitable bearings supported by the framework of the machine and has mounted thereon a multiple disk clutch consisting of a loose member 45 and fixed member 46, sliding on a feather on a counter-shaft 44 by means of an operating lever working in the groove 47 of the fixed member 46. This clutch controls the forward movement of the machine as will be hereafter described. Secured permanently to the loose clutch member 45 is a sprocket wheel 48, which is connected by a chain 49 to a sprocket wheel 50 keyed to the main power shaft 32.

51 indicates a gear wheel keyed to the counter shaft 44 and meshes with the gear wheel 43 secured to the loose clutch member 40 on the power shaft 32.

52 indicates a second counter-shaft suitably mounted in bearings secured to the frame work of the machine and which receives its rotation through means of a gear wheel 53 keyed thereto meshing with a pinion 54 keyed to the counter-shaft 44. The ends of the shaft 44 and 52 are continued beyond the frame of the machine to allow them to be engaged by an ordinary crank handle to permit them to be rotated by hand if desired.

55 indicates a gear wheel freely mounted on the counter shaft 52 and provided with a plurality of holes 56 (Fig. 6).

57 indicates a pinion which is keyed to the counter shaft 52 but capable of sliding longitudinally thereon. A hub 58 secured to the pinion 57 is provided with a flange 59 from which pins 60 project laterally and are adapted to enter the holes 56 in the gear of the wheel 55 to couple said gear to the counter shaft when the hub 58 is moved toward said gear by means of an operating handle working in a groove 61 in the hub 58.

62 indicates a shaft, hereinafter called the traction shaft, provided with a differential gearing of the usual construction located in the housing 63. Secured to one end of the housing is a gear wheel 64 (Figs. 4 and 5) in mesh with the gear wheel 55 on counter-shaft 52. This gear constitutes the high gear of the transmission. Permanently secured to the other end of the differential housing 63 is a large gear wheel 65 which is engaged by the pinion 57 on the counter shaft 52 when said pinion is moved along said shaft into mesh with said gear-wheel 65 and couples the traction shaft 62 to the counter-shaft 52, This large gear constitutes the low gear of the transmission.

66 indicates a sprocket wheel fixed to the traction shaft 62 (Fig. 4) which transmits the driving power to driving wheels 4 through chains 67 and sprocket wheels 68 secured to the wheels 4, the differential gearing being secured to the traction shaft 62. It will thus be seen that the difference in speed of the driving wheels necessary to turn a corner is readily taken care of. The traction shaft 62 also extends beyond the frame of the machine to permit the application of a hand crank whereby the carriage can be turned by hand if desired.

In the operation of the carriage to secure a forward movement thereof, assuming the engine to be operating and the power shaft 62 to the counter shaft 52 through the high shaft and the counter-shaft 44 will be rotated by throwing in clutch 45 which will rotate the shaft through the sprocket 50 fixed to the power shaft and the chain 49 and sprocket 48. The rotation of the counter shaft 44 is transmitted to counter-shaft 52 through gear 53 and pinion 54 and if it is desired that the carriage shall run on high gear the collar 58 on counter-shaft 52 is moved until the pins 60 enter the holes in the gear 55 which couples the traction shaft 62 to the counter shaft 52 through the high gear 64 which drives the carriage at high speed. If it is desired that the carriage shall run on low gear the collar 58 is slipped in the opposite direction to bring the pinion 57 in mesh with the low gear 65 which drives the carriage at low speed.

To obtain a reverse movement of the carriage, the clutch 40 is coupled to the power shaft 32 which rotates the counter-shaft 44 through gears 43 and 51, the clutch 45 being previously freed from the counter-shaft. The counter-shaft 44 rotates the counter-shaft 52, as in the previous case for the forward movement, through pinion 54 and gear 53, the rotation being in turn transmitted to the traction shaft through either the high or the low gear as in the case of the forward movement.

It will thus be noted that the machine has two speeds forward and two reverse.

I will now describe the manner of supporting the front end of the machine to avoid undue strain on the frame and also the means whereby the carriage is steered and the means whereby it can be turned about different points as pivots.

Referring more particularly to Fig. 3, 70 indicates the steering knuckle of the wheels 5 which passes vertically upward through the end blocks 2 of the frame. The knuckle is entirely free from the frame and capable of rotating therein.

71 indicates a bell-crank lever pivotally mounted on a bracket 72 secured to the block 2 or other convenient part of the frame, the end of one arm of which rests upon the upper end of the steering knuckle 70, the other arm being pivotally connected by a link 73 to a similar arm of a similar bell-crank lever 74 supported on a bracket 75 at the other side of the frame. The other arm of the bell-crank lever 74 rests upon the end of the steering knuckle 76 for the other steering wheel. It will thus be seen that the entire front end of the machine is supported by the bell-crank levers 71 and 74 and owing to the small point of contact between the bell-crank levers and the steering-knuckle, friction is reduced to a minimum. Also an equalizing device is provided which prevents strain on the frame as it is obvious that should one wheel run over an obstruction it will compensate with the other wheel as follows:—Should one of the wheels 5 strike an obstruction, the steering knuckle will merely slip vertically upward through the frame and the other steering knuckle will be correspondingly depressed by means of the bell-crank levers and their connecting link and the frame or platform of the machine will remain in a horizontal plane.

Referring more particularly to Figs. 3, 7, 8, 9, 12 and 13, the means for changing the angle of the steering wheels will be described.

80 indicates the steering post journaled in a bracket 81 secured to the cross bar 6 of the frame, said steering post having an arm 82 keyed to the lower end thereof.

83 indicates a segment loosely mounted on the steering knuckles 70 and 76 but prevented from slipping up or down on the knuckle by being held between a collar 84 and an arm 85 keyed to the knuckle. The segments 83 are provided with a number of notches 86 in the face thereof and are pivotally connected to the steering posts by links 87. A clamping lever 88 pivoted to the end of the fixed arm 85 is provided with a short arm 88' which is adapted to engage the notches in the segment 83 and lock the segment to the steering knuckle and the steering post. When the locking lever 88 is turned in a horizontal position the segment 83 is freed therefrom and the steering knuckle can be rotated independent of the steering post. To the upper end of the steering post 80 is clamped a block 89 which has pivoted thereto a steering lever 90. Below the block 89 and secured to the bracket 81 is a disk 91 provided with a number of holes 92. A depending pin 93 secured to the steering lever 90 is adapted to engage any one of the holes 92 when the lever is depressed so that the segments 83 and therefore the steering wheels can be locked in any desired position to correspond with the course it is desired that the carriage should travel.

It will thus be readily seen that either steering wheel can be locked in different angular positions independent of each other by turning the locking lever 88 into a horizontal position and rotating the steering knuckle by means of the arm 85 until the wheel has reached the desired angle when it can again be locked by turning the lever 88 upward and the short arm 88' entering the notches in the segment. One set of notches corresponds to the position of the steering wheels shown in Fig. 15 while the other set corresponds to the position shown in Fig. 16. One of the holes in the disk 91 will lock the wheels in the position shown in Fig. 15, another in the position shown in Fig. 16 and the third will lock the steering wheels for a straight ahead travel so that when the wheels are once set for turning the carriage around on a pivot or for traveling straight ahead, the wheels cannot move as to their relationship to the carriage. In the ordinary travel of the carriage the steering lever 90 will be free of the disk 91 and the steering wheels locked in a position parallel to each other. In Figs. 15 and 16, 100 indicates the points about which the carriage will turn for the positions of the steering wheels shown.

The cutting drum carried by the bars 7 pivoted to the frame is raised up away from the ground by means of the cable and hoisting drum, as described, to allow the carriage to straddle the sand heap when traveling over it to reach the starting point, then the drum is lowered into the sand, cutting its way into the sand by its rotation.

While I have shown and described and prefer to use multiple disk clutches for coupling the various shafts, it will be understood that other forms of clutches might be employed without departing from the spirit of my invention. Also my invention is not limited to the specific means shown for adjusting the angular position of the steering wheels as other means which will readily suggest themselves might be employed without departing from the spirit of this part of my invention.

What I claim as my invention is:—

1. In a traveling sand cutter or mixer, the combination with the carriage, a cutting drum adapted to be raised and lowered and mounted on said carriage, a motor, a power shaft connected to said motor, and to said cutting drum, and means comprising change speed and differential gearing connecting said power shaft with the driving wheels of said carriage.

2. In a traveling sand cutter or mixer, the combination with the carriage, of a frame pivotally mounted on said carriage, a cutting drum mounted on said frame, a motor, a power shaft connected to said motor and to said cutting drum, a traction shaft driven by said power shaft and change speed and differential gearing connecting said traction shaft to the driving wheels of said carriage.

3. In a traveling sand cutter or mixer, the combination with the carriage and cutting drum mounted thereon, of a motor, a power shaft driven by said motor and connected to the cutting drum, a traction shaft driven by said motor and connected to the driving wheels, differential gearing between said traction shaft and said driving wheels and a variable speed gearing through which said carriage wheels are driven.

4. In a traveling sand cutter or mixer, the combination with the carriage and cutting drum mounted thereon, of a motor, a power shaft driven by said motor and connected to said cutting drum, a traction shaft normally free from the power shaft and connected with the driving wheels of the carriage, traction gearing for coupling said traction shaft to said power shaft, whereby said traction shaft can be caused to rotate in either direction, differential gearing through which said driving wheels are driven and means whereby said wheels may be driven at different speeds.

5. In a traveling sand-cutter or mixer, the combination with the carriage and the cutting drum mounted thereon, of a motor, a power shaft geared to said motor, means connected with said power shaft for coupling and uncoupling said cutting drum with the driving power, a traction shaft normally free from the power shaft and connected with the driving wheels of the carriage, transmission gearing for coupling said traction shaft to said power shaft whereby the traction shaft can be caused to rotate in either direction, differential gearing through which said traction shaft must be driven, and a high and a low gear secured to said differential gearing, as and for the purpose described.

6. In a sand mixing or cutting machine, the combination with the frame, of a shaft fixed to said frame, and a cutting drum adapted to rotate loosely on said shaft.

7. In a sand mixing or cutting machine, the combination with the frame, of a shaft fixed to said frame, a sleeve loosely fitting about said shaft and to which the cutting blades are secured, and means for rotating said blades and said sleeve on said shaft.

8. In a sand-cutting or mixing machine, the combination with a cutting drum adapted to be raised and lowered, a winding mechanism adapted to raise and lower said drum, and an adjustable stop coöperating with said winding gear to regulate the lowermost position of the cutting drum.

9. In a sand-cutting or mixing machine the combination with the driving power, of a cutting drum coupled to said driving power and means whereby said drum will be automatically disconnected from said driving power when said drum strikes a solid obstruction.

10. In a traveling sand-cutter or mixer, the combination with the carriage and the cutting drum mounted thereon, a motor, means for coupling said cutting-drum to said motor, a traction shaft normally free from said motor and connected with the driving wheels of the carriage, and means for coupling said traction shaft to the motive power whereby the carriage can be driven ahead at either of two speeds or reverse at either of two speeds.

11. In a traveling sand-cutter, the combination with the frame or carrier, of a cutting drum carried thereby, driving wheels permanently secured to said frame and steering wheels mounted loosely in said frame whereby said wheels may move vertically without moving said frame.

12. In a traveling sand-cutting or mixing machine, the combination with the frame or carrier, of a cutting drum carried thereby, driving wheels permanently secured to said frame and steering wheels mounted loosely in said frame whereby said wheels are free to move angularly and vertically independent of said frame.

13. In a traveling sand-cutting or mixing machine, the combination with the frame, of a cutting drum carried thereby, driving wheels permanently secured to said frame, steering wheels mounted free of said frame and suspension devices bearing on steering wheels and adapted to support the forward end of said frame.

14. In a traveling sand-cutting or mixing machine, the combination with the frame, of a cutting drum carried thereby, driving wheels permanently supporting the rear of said frame, steering wheels free to move in all directions independent of said frame, and suspension devices adapted to mount the forward end of said frame on said steering wheels.

15. In a traveling sand-cutting or mixing machine, the combination with the carriage, of a cutting drum carried thereby, and means adapted to shift the pivot point about which said carriage can be caused to turn.

16. In a traveling sand-cutting and mixing machine, the combination with the frame, of a cutting drum carried thereby, steering wheels freely secured to said frame and means for changing the relation of said wheels to each other.

17. In a traveling sand-cutting or mixing machine, the combination with the carriage, of a cutting drum carried thereby, means for guiding said carriage and means for changing the relation between said guiding means.

18. In a traveling sand-cutting or mixing machine, the combination with the frame, of a cutting drum carried thereby, steering wheels freely secured to said frame, means for changing the relation of said wheels to each other, and means for locking said wheels in fixed relation to each other and in fixed relation to the frame.

19. In a traveling sand cutter or mixer, the combination of a carriage and cutting drum, both motor driven, means for raising and lowering said cutting drum and variable speed gearing through which said carriage is driven.

Signed at Piqua in the county of Miami and State of Ohio this 5th day of May A. D. 1908.

GEORGE W. LORIMER.

Witnesses:
  C. T. TISCHNER, Jr.,
  G. H. VAUGIER.